United States Patent [19]

Tazawa et al.

[11] Patent Number: 5,790,716
[45] Date of Patent: Aug. 4, 1998

[54] IMAGE INPUT APPARATUS

[75] Inventors: Masashi Tazawa; Toshiya Aikawa, both of Kawasaki; Eisaku Maeda, Sakura; Maki Suzuki, Ichikawashi, all of Japan

[73] Assignee: Nikon Corporation, Tokyo, Japan

[21] Appl. No.: 569,864

[22] Filed: Dec. 8, 1995

Related U.S. Application Data

[63] Continuation of Ser. No. 202,010, Feb. 25, 1994, abandoned.

[30] Foreign Application Priority Data

Feb. 26, 1993 [JP] Japan ............................... 5-063160
Oct. 13, 1993 [JP] Japan ............................... 5-255390

[51] Int. Cl.⁶ .................... G06K 9/20; H04N 1/04
[52] U.S. Cl. ................. 382/312; 348/96; 358/474; 382/321
[58] Field of Search .................. 382/312, 321; 355/58, 55, 63, 234, 235; 358/487, 496, 474; 348/96, 112, 110

[56] References Cited

U.S. PATENT DOCUMENTS

| 3,049,590 | 8/1962 | Hooper | 348/110 |
|---|---|---|---|
| 3,629,495 | 12/1971 | Cahill | 358/487 |
| 4,283,136 | 8/1981 | Swift et al. | 355/45 |
| 4,751,376 | 6/1988 | Sugiura et al. | 250/201 |
| 5,038,222 | 8/1991 | Saito | 358/401 |
| 5,113,268 | 5/1992 | Yoshida et al. | 358/474 |
| 5,278,669 | 1/1994 | Takemoto | 348/96 |
| 5,327,259 | 7/1994 | Furusawa | 358/487 |

FOREIGN PATENT DOCUMENTS

| 0 530 027 A2 | 3/1993 | European Pat. Off. |
| 3-145881 | 1/1989 | Japan |
| 3-145882 | 1/1989 | Japan |

OTHER PUBLICATIONS

U.S. patent application Ser. No. 08/597,678, filed Feb. 6, 1996, by Masashi Tazawa et al.

European Search Report dated Jun. 9, 1994.

*Primary Examiner*—Leo Boudreau
*Assistant Examiner*—Bhavesh Mehta

[57] ABSTRACT

An image input apparatus includes an illumination unit to produce a quantity of light to illuminate a transmitting original and a support unit operable to allow the quantity of light to be scanned and to support and move the transmitting original. Additionally, the image input apparatus includes a reading unit to read light which is received by or passed through the transmitting original.

3 Claims, 6 Drawing Sheets

IMAGE INPUT APPARATUS

This application is a continuation of application Ser. No. 08/202,010, filed Feb. 25, 1994, now abandoned.

BACKGROUND OF THE INVENTION

1. Field of the Invention

The present invention relates to image input apparatuses used to process images formed on films and the like through use of transmitted illumination.

2. Description of the Related Art

Image input apparatuses are well known. In fact, many image input apparatuses are configured in a manner to include illumination units to illuminate and to guide illuminating light towards a "transmitting original." Moreover, such image input apparatuses often include scanning units comprising carriages which provide support structures to support the transmitting original during processing. Additionally, projection units are often used as reading units for imaging transmitted light on a line sensor (e.g., a charged coupled device or "CCD").

Typically, the light illuminated from an illumination unit is condensed into a linear form on the transmitting original, and after transmission through the original, is imaged on a CCD. The transmitted light is read a line at a time to produce a sequence of data (e.g., digital data related to the transmitting original). After a line has been read, a scanning unit performs a movement of a line, thereby changing the position of the transmitting original, and reading is again performed. By repeating this kind of reading and movement over a series of times, the scanning of an image surface is successfully performed.

A typical image input apparatus which contains the structure and performs as described above, is disclosed in Japanese Laid-Open Patent Publication 3-145881 (JP-A-3-145881). In JP-A-3-145881, there is proposed a well-known optical reading unit. More particularly, the optical reading unit comprises a support body with a film insertion aperture formed on the surface of the support body for the insertion of a film. The film acts as a transmitting original. The optical reading unit also includes a conveyor device for freely conveying the film from the film insertion aperture in a direction towards the interior of the optical reading unit. Movement is carried out in a reciprocating manner. Additionally, at least one portion of the optical reading unit has an optical axis which is transverse to the conveying direction of the conveyor device.

In terms of the problems associated with typical image reading apparatuses and optical reading apparatuses, such apparatuses typically require a carriage to support and move a film disposed on a conveyor means which moves along a fixed shaft. As such, a focus adjustment in the optical axis direction of the light which the film transmitted or reflected is impossible. Accordingly, because of the aforementioned problem, straight or flat films may be scanned, but not curled or rolled films.

Additionally, as typical image reading apparatuses that maintain racks which are operationally engaged with pinion gears driven rotationally by a motor which is fixed only at one end to a film carrying carriage, the engagement of the pinion gear becomes uncertain due to warping and the like. Furthermore, because typical image reading apparatuses comprise structure such as plate springs used to press on a film inserted into a carriage, the film surface moves as a result of the scatter of the film mount thickness, and can not be supported at true focus points.

SUMMARY OF THE INVENTION

In view of the above-described problems associated with typical and well known image reading apparatuses, it is an object of the present invention to solve such problems in an efficient, cost-effective manner.

It is therefore another object of the present invention to provide an image input apparatus, the focus of which is adjustable in the optical axis direction of transmitted or reflected light from a transmitting original which is supported on a support unit.

It is yet another object of the present invention to provide an image input apparatus which can accurately perform movements of its support unit.

It is still another object of the present invention to provide an image input apparatus which can accurately support a transmitting original on a support unit.

Additional objects and advantages of the invention will be set forth in part in the description which follows, and, in part, will be obvious from the description, or may be learned by practices of the invention.

These and other objects of the present invention are achieved in that the present invention provides an image input apparatus which comprises an illumination unit to produce a quantity of light to illuminate a transmitting original, a support unit to scan the quantity of light and to support and move the transmitting original and a reading unit to image and read light reflected by or passed through the transmitting original.

Additionally, the present invention provides an image reading unit which comprises an illumination unit to produce a quantity of light to illuminate a transmitting original, a support unit to scan the quantity of light and to support and move the transmitting original, a reading unit to image and read light reflected by or passed through the transmitting original, a rack formed in the support unit, a pinion gear rotationally driven by a motor and a regulation unit to regulate the displacement of the rack.

Finally, the present invention also provides an illumination unit which comprises an illumination unit to produce a quantity of light to illuminate a transmitting original, a support unit to scan the quantity of light and to support and move the transmitting original, a reading unit to image and read light reflected by the transmitting original and a compression unit to elastically sandwich and compress a first side and a second side of the transmitting original in the support unit.

BRIEF DESCRIPTION OF THE DRAWINGS

The above-identified and other objects and advantages of the present invention will become apparent and readily appreciated from the following descriptions of the preferred embodiments, taken in conjunction with the accompanying drawings of which.

DESCRIPTION OF THE PREFERRED EMBODIMENTS

A first embodiment of the image input apparatus of the present invention is described below, with reference to the drawings figures which were briefly described above.

Figure 1:
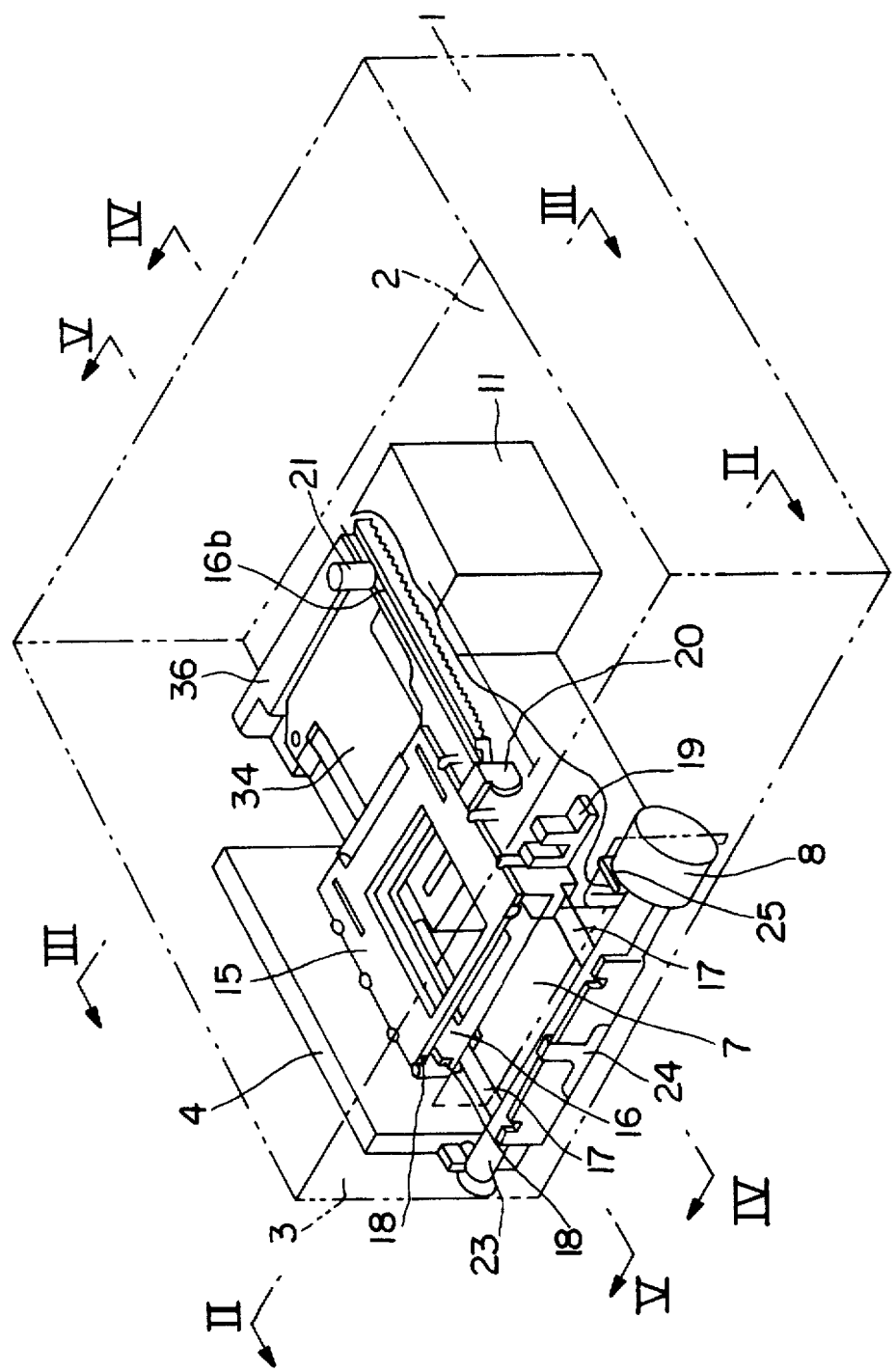
FIG. 1 is an oblique view of an image input apparatus according to an embodiment of the present invention.

A first embodiment of the present invention is now described with reference to FIGS. 1–6. Referring generally to FIG. 1, an image input apparatus comprises an illumination optical unit as an illuminating means which shines or emits imaging light on a film or transmitting original, a scanning unit to scan the illuminating light by moving a carriage which serves as a retention means to retain the film and a reading projection optical unit for imaging transmission light from the film on a charged coupled device (CCD). The aforementioned components are housed in a housing which is discussed below.

The housing includes an aluminum diecast body 1 having a bottom cover 2 which covers the lower part of the body 1. A front panel 3 covers the front surface of body 1. In body 1, a mechanical body 4 is configured to receive the image reading system which includes the aforementioned scanning unit, illumination unit and projection optical unit. The image reading system and a main board 5 (FIG. 2) are secured in body 1 by screws, but may be fastened using any well known fastening system.

The front side of the bottom cover 2 is configured so that it rests against front panel 3, and the rear side, not shown in the drawing, is fixed by screws to the body 1. The bottom cover 2 and the front panel 3 cover the image reading system.

Figure 2:
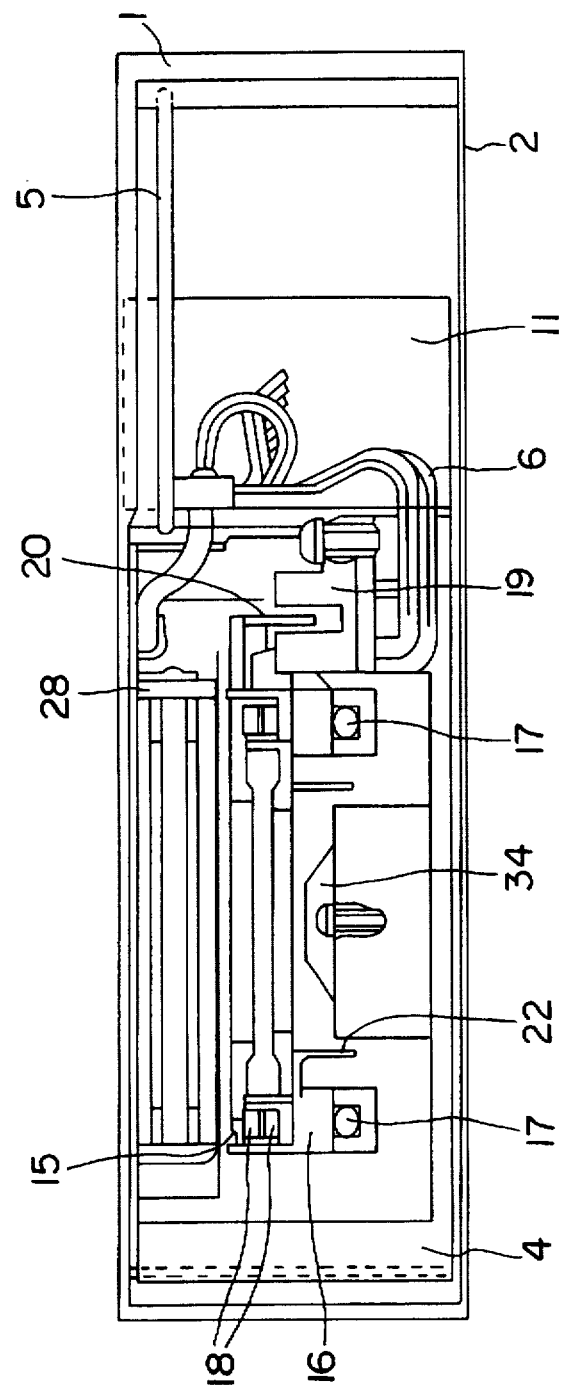
FIG. 2 is a sectional view taken along the line II—II of FIG. 1.
Figure 3:
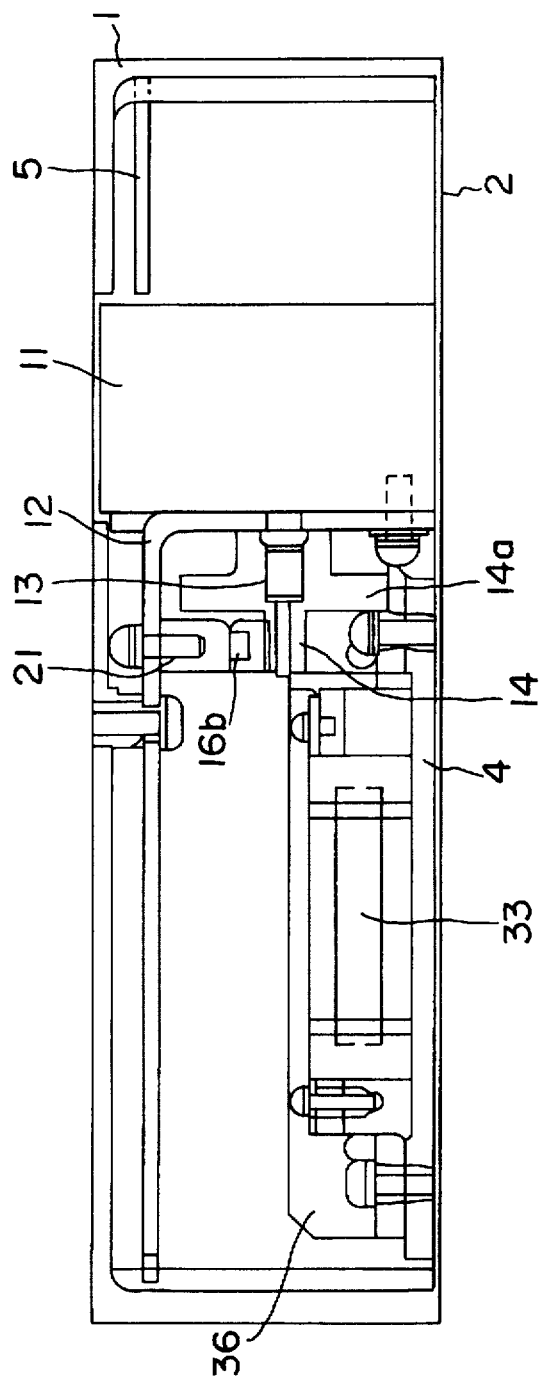
FIG. 3 is a sectional view taken along the line III—III of FIG. 1.

Four harnesses 6 are connected between the main board 5 and the mechanical body 4 as depicted in FIG. 2. Moreover, an aperture 7 for insertion of a film mount, and an LED window (not shown in the drawing) for display of photographic information, are disposed in the front panel 3. Moreover, a portion of the outer circumference of a focus dial 8 (discussed below) projects from the front panel 3, so that a focusing operation is possible from the front of the image input apparatus. Furthermore, there is a large aperture located between the front panel 3 of body 1 and the opposite side surface of body 1, such that connections can be made to various connectors disposed on the main board 5.

The carriage portion is constituted by the scanning unit, the retention movement mechanism of the film mount and the focusing adjustment mechanism. A motor portion comprises a motor power transmission mechanism to transmit the motor drive force to the carriage portion. The motor portion comprises a stepping motor 11 and a reduction gear 14a (FIG. 3) (integral with the pinion 14) to reduce the rotation of the stepping motor 11. Reduction gear 14a is fixed to a motor mounting board 12. Motor mounting board 12 is fixed with screws to mechanical body 4.

The stepping motor 11 fixed to the motor mounting board 12 rotates a motor gear 13 into which the motor shaft is pressed. The pinion gear 14 (FIG. 3) is rotated via the reduction gear 14a. While stepping motor 11 makes 0.9 revolutions per 1 step corresponding to 1 line of the image, the present invention is not so limited.

Figure 6:
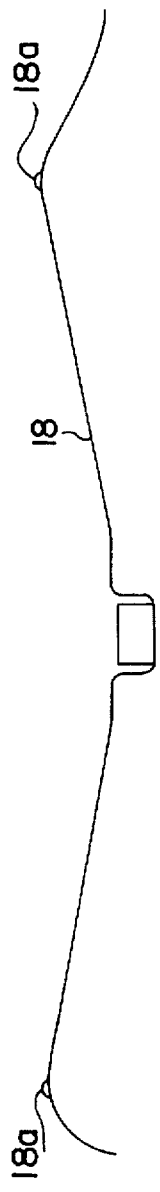
FIG. 6 is an enlarged side view which shows the film holding spring depicted in FIG. 1.

A carriage unit comprises a carriage 15 and a carriage 16 which are positioned integrally opposed at a predetermined spacing. More particularly, both ends are fitted into groove portions of the mechanical body 4 so that they are movably guided by a horizontal guide bar 17. Two respective film holding springs 18 are fixed facing each other at both edges of the facing surfaces of carriage 15 and carriage 16. Spherical projections 18a are formed front and rear, as shown in FIG. 6, on the film holding springs 18. A film mount may be inserted between carriages 15 and 16 to come into contact with projections 18a.

By balancing the force of the film holding springs 18, even if film mounts of different thicknesses are inserted between carriages 15 and 16, the film mount is normally positioned in the center between the carriages 15 and 16. Accordingly, even if the thickness of the film mount differs, if the emulsion surface of the film is positioned at the center of the mount, by centering the focus dial 8 mentioned below, focusing adjustment is unnecessary. Moreover, by disposing the projections 18a on the film holding springs 18, the position of the springs 18 which comes into contact with the film mount is practically constant, and the film mount can be more precisely positioned in the center of the carriage 15 and the carriage 16, with no inclination.

A rack 16a (FIG. 5) having skew teeth, each of module 0.3 for example, is integrally formed parallel to the direction of movement, on the carriage 16. The pinion gear 14 is in engagement with the helical rack 16a. As such, the drive force of the stepping motor 11 is transmitted to the rack 16a and the movement of the carriage 15 and the carriage 16 is performed.

A U-shaped photointerruptor 19 (FIG. 1) is fixed by screws to the mechanical body 4, and a photointerruptor detection vane 20 is integrally mounted on carriage 15 in a position to pass along the photointerruptor 19. The foregoing arrangement allows for the starting point of carriages 15 and 16 to be detected. The tip of the photointerruptor detection vane 20 becomes R shaped with the rotation center of the guide bar 17 as the center post even during rotary motion of guide bar 17 when the same is performed during focus adjustments as mentioned below.

A rack carriage groove portion 16b is formed longitudinally in the rear side of the rack 16a of the rack carriage 16. A rack support bar 21 fixed to the motor mounting plate 12 is fitted to slide freely in the rack carriage groove portion 16b. Warping of the rack 16a is suppressed in the aforementioned manner so that the engagement with the pinion 14 can be made accurate.

Figure 7:
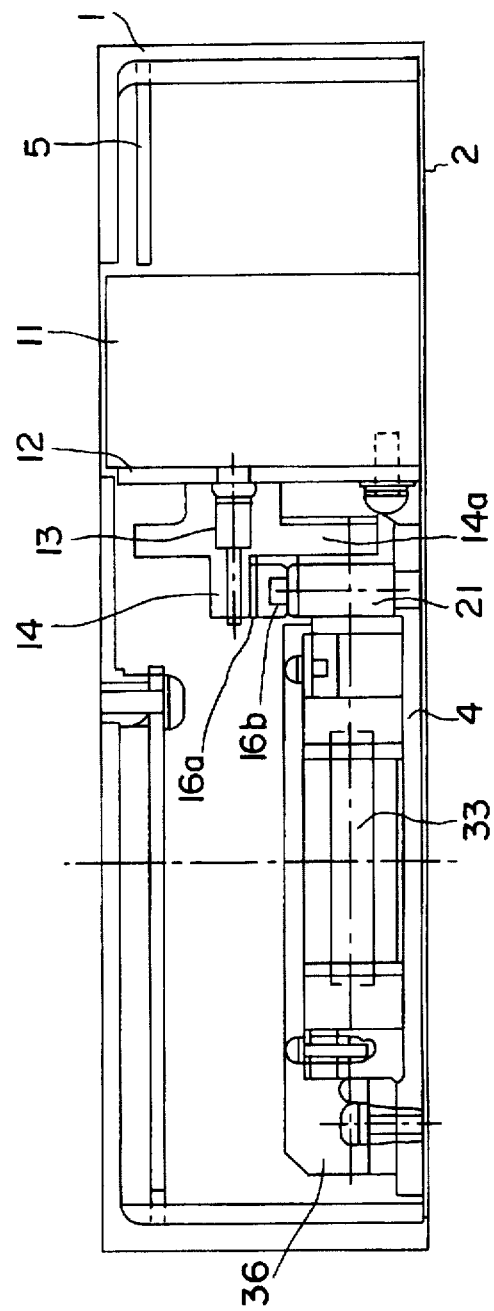
FIG. 7 is a cross-sectional view taken along the line III—III of FIG. 1 illustrating another embodiment of an image input apparatus according to the present invention.

Another example of rack support is next shown in FIG. 7 with general reference to FIGS. 1–6.

The structure depicted in FIG. 7 indicates that it is possible to mount the rack support bar 21 on the mechanical body 4. The up and down relationship of the rack 16a and the pinion gear 14 is constituted contrary to the first-mentioned embodiment. Here, the rack support bar 21 is fixed to the mechanical body 4. By fixing the rack support bar 21 to the mechanical body 4, the positional error with the rack carriage groove portion 16b is reduced so as the carriage portion can be moved smoothly in the secondary scanning direction. These advantages result because the motor mounting plate 12 does not rotate as with the first embodiment and because the rack support bar 21 can be mounted to the mechanical body 4.

Moreover the rack support bar may be formed from, among other things, molded plastic and the like, so as to easily slide on the mechanical body 4. Alternatively, rack support bar 21 may also be held in place via fastening systems or even formed integral with the mechanical body 4.

Figure 4:
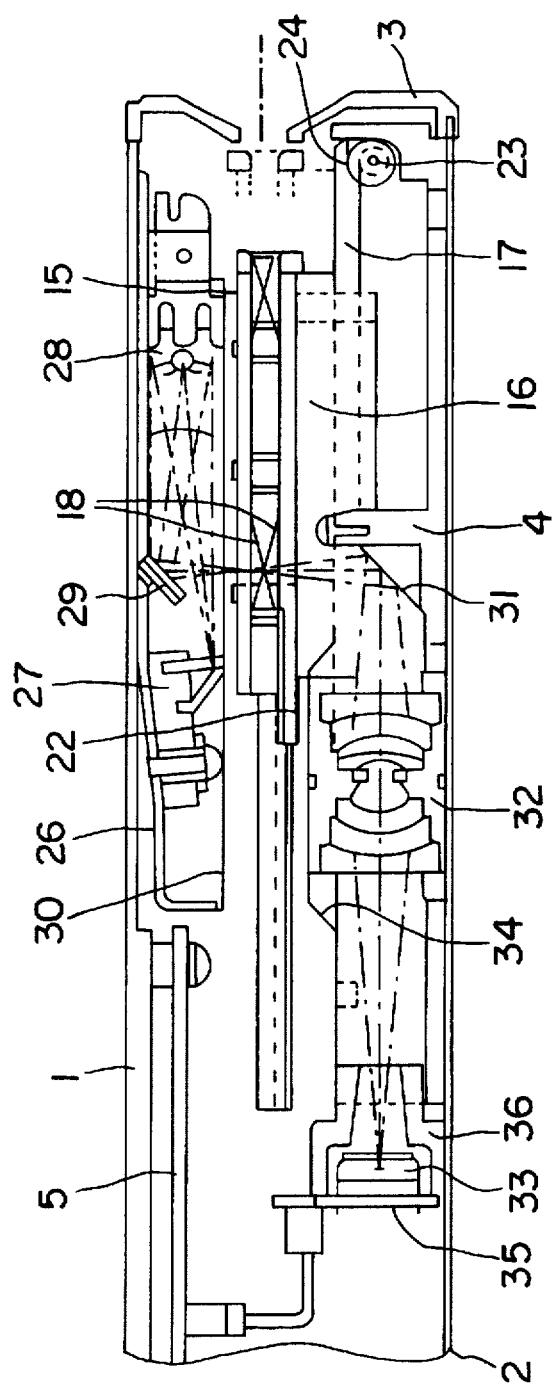
FIG. 4 is a sectional view taken along the line IV—IV of FIG. 1.
Figure 5:
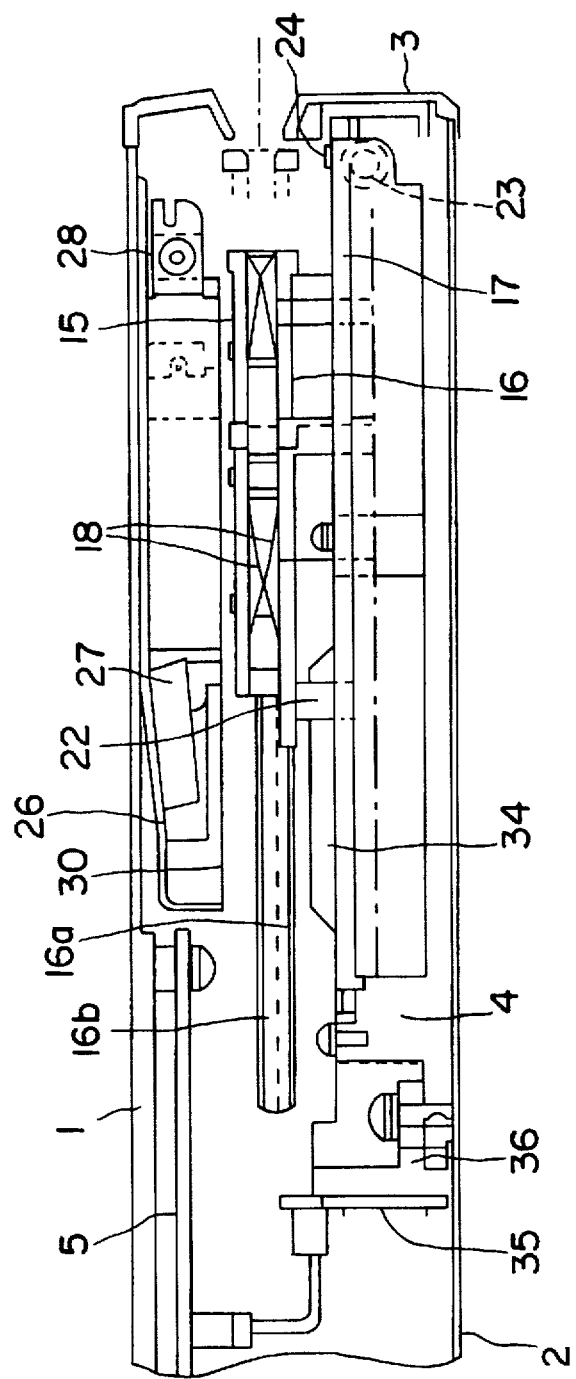
FIG. 5 is a sectional view taken along the line V—V of FIG. 1.

In this embodiment, as also shown in FIG. 4, an ejector plate 22 (see e.g., FIG. 4) is disposed between the carriage 15 and the carriage 16. When a film mount is inserted between the carriages 15 and 16, the film mount contacts the ejector plate 22. When the carriages 15 and 16 move, the ejector plate 22 contacts a part of the mechanical body 4 and comes to a stop against the mechanical body 4, but the carriages 15 and 16 continue to move in an inward direction. As such, the film mount which is in contact with the ejector plate 22 is displaced forward relative to the carriages 15 and 16. Accordingly, when the carriages 15 and 16 return to the film insertion position (i.e., because the film mount projects from the front panel 3, the film mount can easily be removed.

One end of the inner side of the guide bar 17 (see e.g., FIG. 4) is rotatably supported in contact with the mechanical body 4. Moreover, one end of the front surface of the guide bar 17 is disposed in a right angled direction relative to the guide bar 17, and is in contact with an eccentric shaft 23. Eccentric shaft 23 is freely and rotatably supported on the mechanical body 4, via a guide bar retaining spring 24. Furthermore, one end of the eccentric shaft 23 is pressed into a focusing dial 8. When the dial 8 rotates, the eccentric shaft 23 also rotates. The guide bar 17 rotates with the end on the inner side as a center, and becomes displaced in an up and down direction. Moreover, a dial friction part 25, which is a Teflon friction plate mounted on the mechanical body 4, is in sliding contact at the end surface of the focusing dial 8, and the free rotation of the focusing dial 8 comes to a stop.

According to the above-mentioned structures, the image reading position is at the center of the longitudinal direction of the guide bar 17, and by means of a displacement of ±1 mm of one end of the front side of the guide bar 17 due to the rotation of the eccentric shaft 23, a focus adjustment of ±0.5 mm at the reading position becomes possible.

Referring again to FIG. 4, the illumination optical unit comprises an illumination base 26, an LED block 27, a toric mirror 28, forty mirrors 29, and an optical system cover 30. The entire illumination optical unit is mounted to the mechanical body 4 with flat head screws or other well known fastening system.

The LED block 27 (e.g., the present invention's light source) is fixed on the illumination base 26 via an insulating sheet by insulating collars and screws. The toric mirror 28 is mounted on the illumination base 26 and is rotatable in a cylindrical projection disposed on a side surface as a shaft. The forty mirrors 29 located in the illumination base 26 are fixed by adhesion in the deflection portion. The illumination system cover 30 covers the LED block 27, the toric mirror 28, and the forty mirrors 29, so as to be fixed via two tubular stop portions disposed in the illumination base 26. Furthermore, slit(s) is/are disposed at the top of the forty mirrors 29 in order for the illuminating light to pass through in the direction of the film mount. Moreover, the interior of the illuminating optical system is illuminated from incident external light by the illuminating system cover 30.

A photographic optical system comprises forty-five reflecting mirrors 31, projection lenses 32, CCD 33, and a projection system cover 34. The photographic optical system is positioned in the central lower portion of the mechanical body four, partitioned three ways by walls. The forty-five reflecting mirrors 31 are fixed in contact with the mechanical body 4. The projection lenses 32 are constituted by four groups of 6 lenses and are disposed symmetrically. The projection lenses are fixed in a lens compartment by separating rings and presser rings, and the lens compartment is fixed to the mechanical body 4 by set screws.

The CCD 33, mounted on a CCD board 35, is fixed in the mechanical body 4 via a CCD holder 36. Moreover, the projection system cover 34 is fixed by screws to the outer circumference of the portion partitioned by walls.

According to the above-mentioned structures, the light which the original film transmitted was deflected 90° by means of the forty-five reflecting mirrors 31, so as to be imaged by the projection lenses 32 on the CCD 33. Moreover, the CCD holder 36 effects light shielding and dustproofing functions. Furthermore, the projection system cover 34 also effects light shielding and dustproofing functions for the projection optical system, and also serves for the restraint of the guide bar 17 of the scanning unit.

The foregoing discussions indicate that because a support unit is movable in the direction of the optical axis of transmitted light, accurate focus adjustment of a transmitting original becomes possible.

Moreover, because a regulating unit described above is disposed to regulate the displacement of a rack formed in a support member or unit, displacements such as warping of the rack can be prevented. Additionally, accurate engagement between a regulating unit and a pinion gear is now possible.

Also, because the regulating unit of the present invention is configured to be fixed in position, displacement is minimized and possibly even reduced. Thus, warping and like displacements of the rack can be minimized to allow pinion gears to be accurately engaged.

Additionally, because both sides of a transmitting original can be supported by support members, the transmitting original can be positioned in the center of a support member or unit thereby altering and minimizing the occurrence of inclination.

Finally, it should be noted and understood that the present invention is not limited to the structure of the above-described and disclosed embodiments, and it goes without saying that many modifications and changes may be made to the form, structure and operation of the aforementioned embodiments, without departing from the spirit or scope of the present invention which is defined in the appended claims and equivalents thereof.

What is claimed is:

1. An image input apparatus comprising:

an illumination unit emitting a quantity of light to illuminate an original so that the original passes light;

a holder holding the original;

an imaging optical system imaging the light passed through the original;

a photoelectric conversion circuit which receives, in the form of lines, the light imaged by said imaging optical system, and converts the imaged light into electrical signals for processing;

a guide mechanism, including a pair of linear guide members, guiding the holder to move the original in a plane approximately parallel to the surface of the original;

a driver unit driving the holder along the pair of linear guide members;

a regulation unit which regulates an imaging state of the imaging optical system, by moving the guide mechanism, including the pair of linear guide members, in a direction approximately perpendicular to the surface of the original, the regulation unit including an eccentric shaft; and a body;

wherein respective first ends of the pair of linear guide members connect to the eccentric shaft and respective second ends of the pair of linear guide members are rotatably connected to the body.

2. The image input apparatus of claim 1, further comprising a dial member connected to an end of the eccentric shaft, wherein at least a portion of the dial is rotatable from exterior of the body, the rotation of the dial causing the eccentric shaft to rotate.

3. The image input apparatus of claim 1, further comprising:

a spring; and a dial member pressed to the eccentric shaft by the spring, wherein at least a portion of the dial member is rotatable from exterior of the body, the rotation of the dial member causing the eccentric shaft to rotate.

* * * * *